(12) United States Patent
Friedly et al.

(10) Patent No.: US 10,241,219 B2
(45) Date of Patent: Mar. 26, 2019

(54) SENSOR DEVICE HAVING ELONGATED HOUSING

(71) Applicant: WESTERNGECO L.L.C., Houston, TX (US)

(72) Inventors: Seth Friedly, Sandvika (NO); Einar Holst, Oslo (NO); Kambiz Iranpour, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 1081 days.

(21) Appl. No.: 14/340,613

(22) Filed: Jul. 25, 2014

(65) Prior Publication Data

US 2016/0025875 A1 Jan. 28, 2016

(51) Int. Cl.
| | | |
|---|---|---|
| G01V 1/00 | (2006.01) | |
| G01V 1/20 | (2006.01) | |
| G01V 1/16 | (2006.01) | |
| G01V 13/00 | (2006.01) | |

(52) U.S. Cl.
CPC ............... *G01V 1/20* (2013.01); *G01V 1/162* (2013.01); *G01V 13/00* (2013.01); *G01V 1/168* (2013.01)

(58) Field of Classification Search
USPC ......................................................... 367/178
See application file for complete search history.

(56) References Cited

U.S. PATENT DOCUMENTS

| | | | | |
|---|---|---|---|---|
| 4,163,206 A | | 7/1979 | Hall, Jr. | |
| 4,599,713 A | * | 7/1986 | Rudaz ...................... | G01V 1/16 181/122 |
| 5,010,531 A | * | 4/1991 | McNeel .................. | G01V 1/184 174/74 A |
| 6,301,195 B1 | * | 10/2001 | Faber ...................... | G01V 1/181 367/188 |
| 7,013,745 B2 | * | 3/2006 | Kolarczyk .............. | G01V 3/165 175/50 |
| 2005/0178220 A1 | * | 8/2005 | Kolarczyk .............. | G01V 3/165 73/866.5 |
| 2006/0213290 A1 | * | 9/2006 | Kolarczyk .............. | G01V 3/165 73/866.5 |
| 2013/0272091 A1 | * | 10/2013 | Yilmaz .................. | G01V 1/166 367/77 |
| 2014/0219053 A1 | * | 8/2014 | Goujon .................. | G01V 1/162 367/38 |

(Continued)

FOREIGN PATENT DOCUMENTS

WO 2013134199 A1 9/2013

OTHER PUBLICATIONS

Written Opinion of the International Search Authority for PCT/US2015/041875.*

(Continued)

*Primary Examiner* — James R Hulka
(74) *Attorney, Agent, or Firm* — Kevin B. McGoff

(57) ABSTRACT

A sensor device includes an elongated housing containing particle motion sensors spaced apart along a longitudinal axis of the elongated housing, where the elongated housing has a length that is greater than a width of the elongated housing. A second portion includes communication circuitry to communicate over a communication medium, the second portion coupled to the elongated housing and having a width that is greater than the width of the elongated housing.

19 Claims, 13 Drawing Sheets

(56) References Cited

U.S. PATENT DOCUMENTS

2014/0219055 A1\* 8/2014 Goujon .................. G01V 1/162
367/56

OTHER PUBLICATIONS

International Search Report and Written Opinion issued in related International Application No. PCT/US2015/041875 dated Oct. 23, 2015 (13 pages).

\* cited by examiner

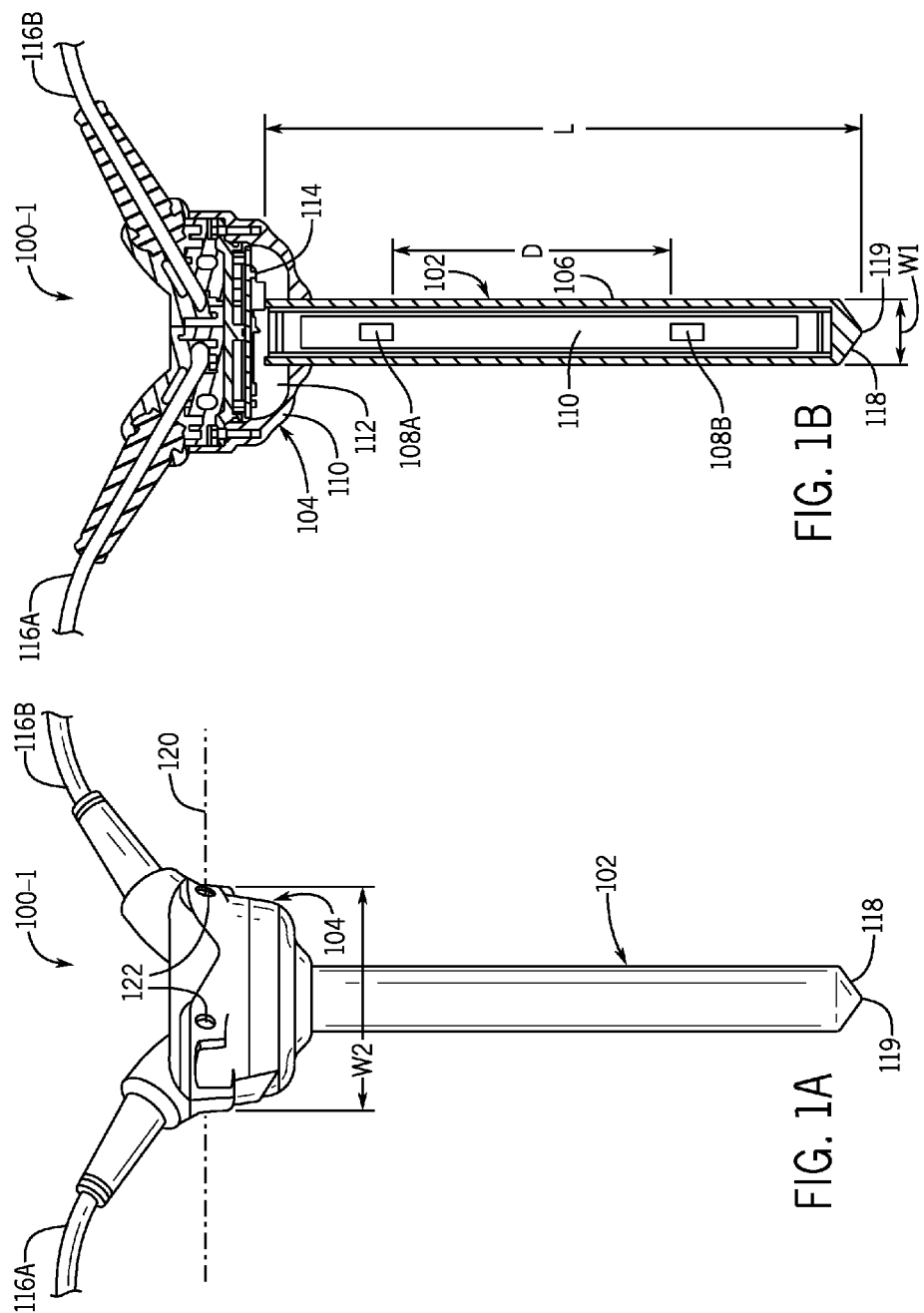

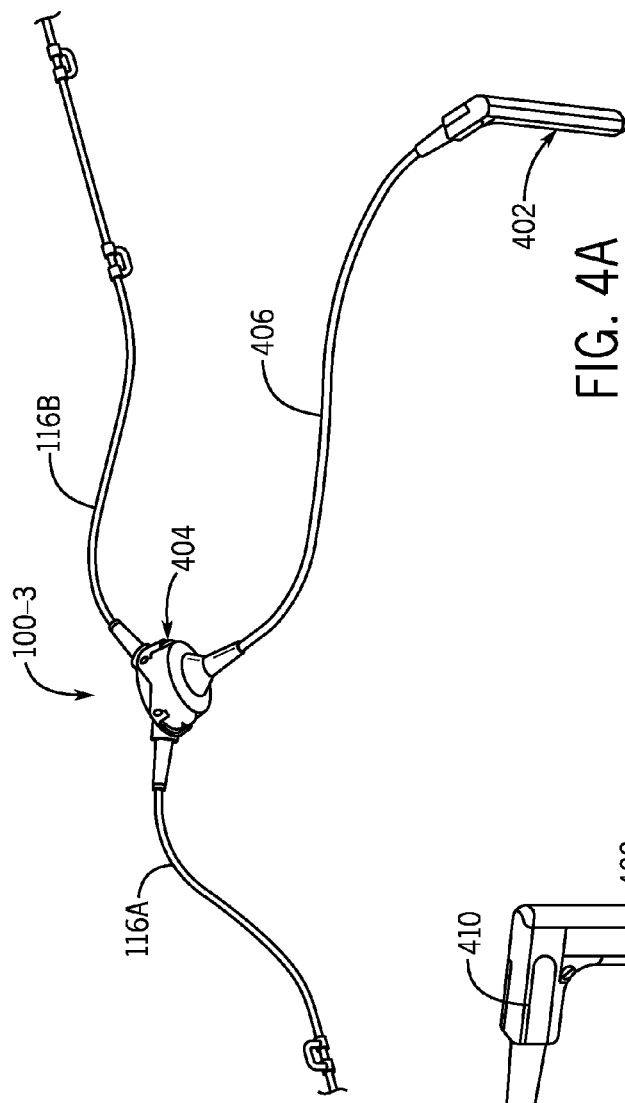
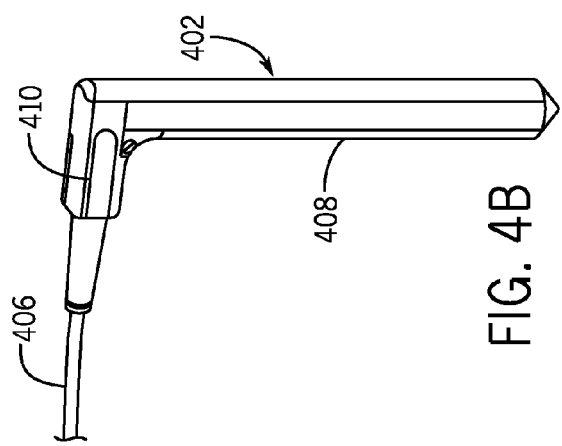

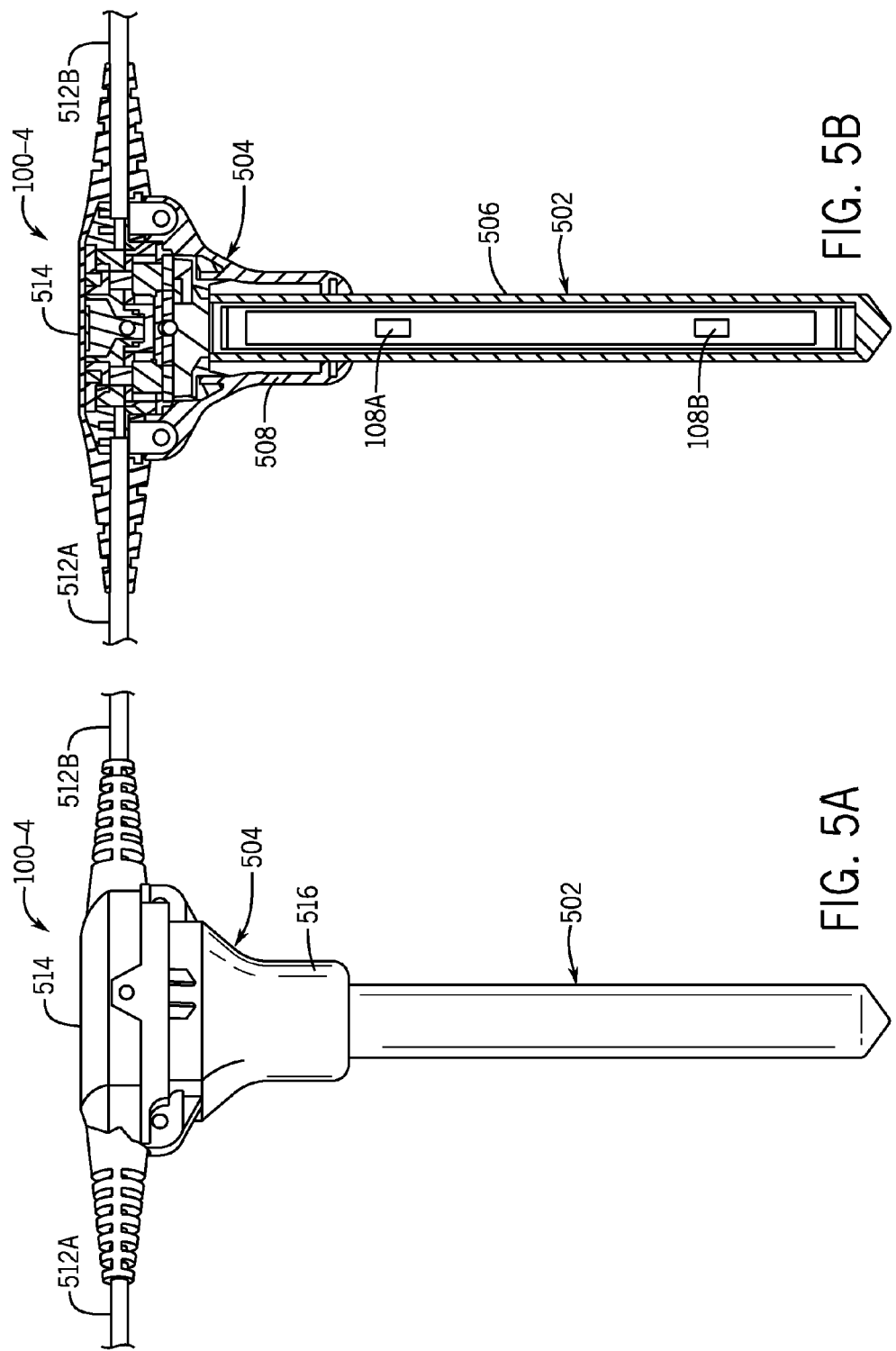

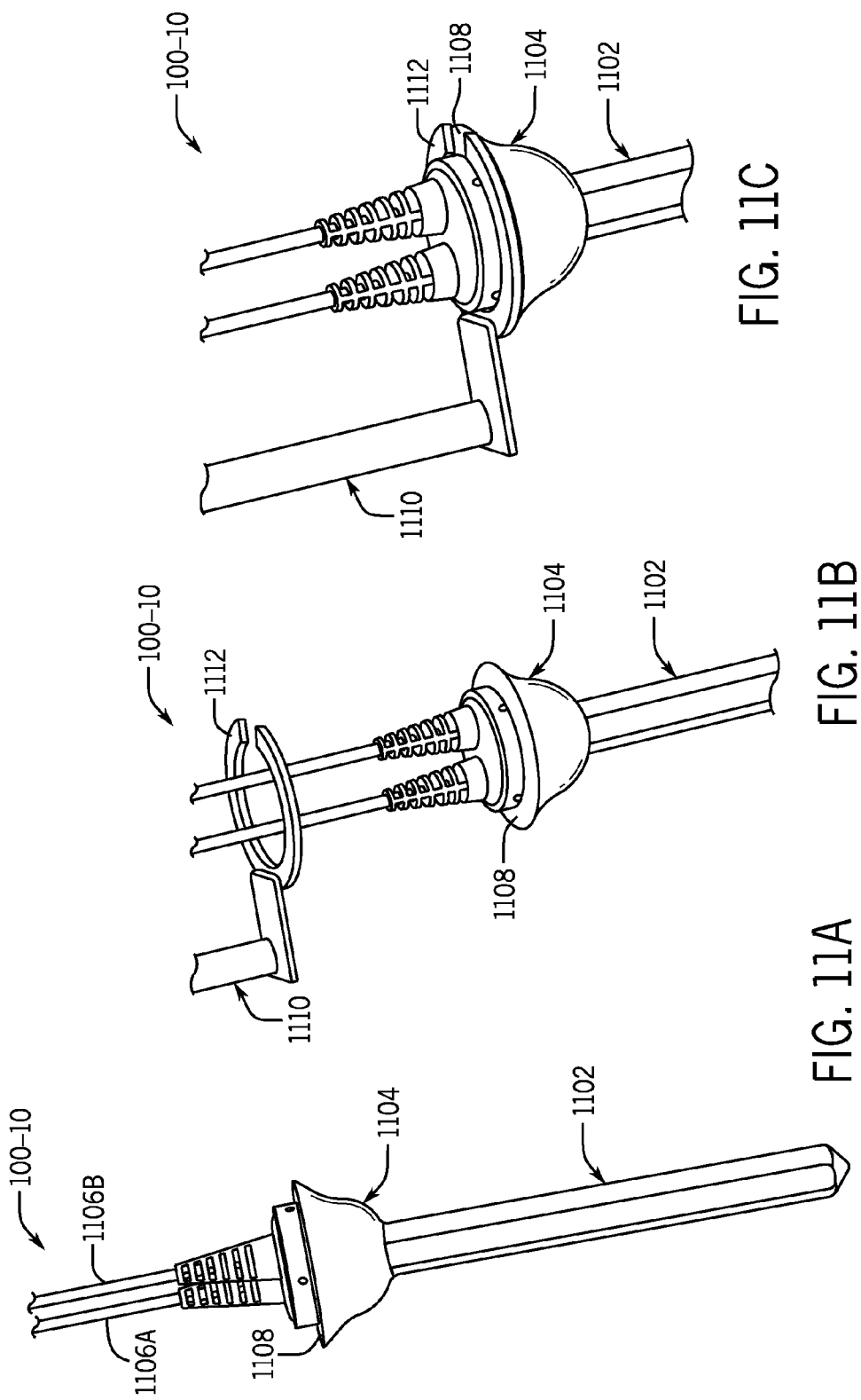

SENSOR DEVICE HAVING ELONGATED HOUSING

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g. geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

In general, according to some implementations, a sensor device includes an elongated housing containing particle motion sensors spaced apart along a longitudinal axis of the elongated housing, where the elongated housing has a length that is greater than a width of the elongated housing. The sensor device further includes a second portion including communication circuitry to communicate over a communication medium, the second portion coupled to the elongated housing and having a width that is greater than the width of the elongated housing.

Other features will become apparent from the following description, from the drawings, and from the claims.

BRIEF DESCRIPTION OF THE DRAWINGS

Some embodiments are described with respect to the following figures.

FIGS. 1A-1B, 3, 4A-4B, 5A-5B, 6, 7A-7B, 8, 9, 10A-10B, and 11A-11C depict sensor devices according to various implementations.

DETAILED DESCRIPTION

Figure 2C:
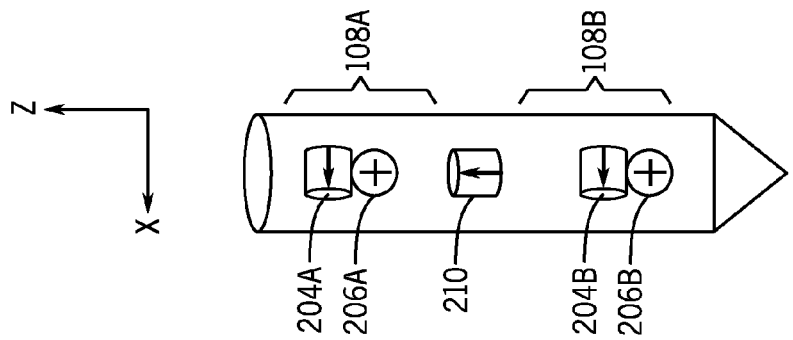
FIGS. 2A-2C are schematic diagrams of sensor components within a sensor device according to some implementations.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface (land surface or bottom surface of a body of water, such as a seafloor) to measure seismic waves reflected from a subterranean structure, in response to seismic waves (or impulses) produced by one or more seismic sources and propagated into an earth subsurface. A particle motion sensor provided at a ground surface can refer to a particle motion sensor that is placed in contact with the ground surface, partially buried in the ground surface, or completely buried in the ground surface up to a predetermined depth (e.g. up to a depth of less than 5 meters). A particle motion sensor at (or proximate) the earth surface can record the vectorial part of an elastic wavefield just below the free surface (i.e. ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about they axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

FIG. 1A is a side view of an example seismic sensor device 100-1 according to some implementations. FIG. 1B is a sectional view of the sensor device 100-1. The sensor device 100-1 includes a stick-shaped portion 102 and an enlarged portion 104. As shown in the sectional view of FIG. 1B, the stick-shaped portion 102 has an elongated housing 106 having a length L along a longitudinal axis of the elongated housing 106. The elongated housing 106 also has a width W1 along a dimension of the elongated housing 106 that is perpendicular to the longitudinal axis. The length L is greater than the width W1 of the elongated housing 106. In some implementations, the length L can be 15 centimeters (cm) or greater, and the width W1 can be 2 cm or greater. In further implementations, the length L and width W1 of the elongated housing 106 can be designed such that the ratio of L to W is greater than or equal to 7.

As further depicted in FIG. 1B, sensor components 108A and 108B are contained within a chamber 110 inside the elongated housing 106 of the stick-shaped portion 102. Although just two sensor components are depicted in the example of FIG. 1B, note that in further examples, more than two sensor components can be contained inside the chamber 110 of a single housing (i.e. the elongated housing 106). The elongated shape of the elongated housing 106 of the stick-shaped portion 102 of the sensor device 100-1 allows the sensor components 108A and 108B to be spaced apart along the longitudinal axis of the elongated housing 106, by a distance D. In some implementations, the sensor components 108A and 108B are co-axial along the longitudinal axis of the elongated housing 106.

The elongated housing 106 can be in the form of a hollow tube, a stick, or other elongated structure. In some examples, the elongated housing 106 can be cylindrical in shape. The cross section of the elongated housing 106 can be circular or non-circular in shape. Examples of non-circular cross-sections of the elongated housing 106 include a hexagon, a rectangle, or any other polygon.

The elongated housing 106 can be made out of a material, such as plastic (e.g. conductive plastic or non-conductive plastic), metal, a metal foam, a combination of plastic and metal (e.g. metal deposited on plastic or vice versa), and so forth. According to an example embodiment, the housing 106 may be configured to not resonate within a frequency bandwidth of interest for target signals that are to be measured. In some examples, the bandwidth of interest can be in the range between 1 to 250 Hertz (Hz). In other examples, the elongated housing 106 may exhibit resonance; in such examples, the resonance can be removed by processing, or the resonance can be compensated for by processing.

By arranging the sensor components 108A and 108B in the elongated housing 106 as shown in FIG. 1B, the sensor components 108A and 108B are spaced apart along just the longitudinal axis. In other words, in some implementations, the sensor device 100-1 does not include sensor components that are spaced apart in any other direction (other than a direction parallel to the longitudinal axis).

However, in further implementations, there can be sensor components that are spaced apart along the dimension of the width W1, for example.

FIG. 1A shows a portion of the sensor device 100-1 being below a ground surface 120, and a portion of the sensor device 100-1 being above the ground surface 120. According to some examples, an arrangement can include the sensor component 108B below the ground surface 120 and the sensor component 108A above the ground surface 120. A sensor component can also be positioned at or proximate the ground surface 120. According to an example arrangement, a majority of the sensor device 100-1 can be below the ground surface 120. According to another example arrangement, a majority of the sensor device 100-1 can be above the ground surface 120. Another example arrangement can have approximately half the sensor device 100-1 above and half the sensor device 100-1 below the ground surface 120. Another example arrangement can have the entirety of the sensor device 100-1 below the ground surface 120.

The enlarged portion 104 of the sensor device 100 includes an outer housing 110 that defines an inner chamber 112 in which various circuitry can be included. The outer housing 110 of the enlarged portion 104 can be formed of a material selected from the possible materials listed above for the elongated housing 106. A width W2 of the enlarged portion 104 (as measured along a dimension of the enlarged portion that is parallel to the dimension of the width W1 of the stick-shaped portion 102) is greater than the width W1. The larger size of the enlarged portion 104 allows greater space to accommodate circuitry. In some implementations, the width W2 is greater than the width W1 by a factor of 2 or greater, or 3 or greater.

The circuitry contained in the enlarged portion 104 can include a communication interface circuit 114 (FIG. 1B), which is connected to communication media 116A and 116B (e.g. electrical cables, fiber optic cables, etc.). Alternatively, the communication interface circuit 114 can communicate wirelessly over a wireless medium over which data can be communicated. The communication interface circuit 114 is connected to the sensor components 108A and 108B. Data acquired by the sensor components 108A and 108B are transferred to the communication interface circuit 114, which in turn transmits the acquired data over the communication media 116A, 116B for communication to a remote station, which can be a recording station, a computer, and so forth.

According to other examples, a memory can be provided and incorporated in the enlarged portion 104. The memory can also be separate from the sensor device 100-1 and connected by wire, or short range wireless technology such as Wi-Fi or Bluetooth.

Also, the enlarged portion 104 can include control circuitry to control the sensor components 108A, 108B. Additionally, an analog-to-digital converter and other components may be included, such as in the communication interface circuit 114, to convert signals measured by the sensor components 108A, 108B into digital form. The components in the sensor device 100-1 may be powered by a battery, a solar panel, or through a wired or wireless connection.

The bottom portion of the sensor device 100-1 may include a spike 118 for driving the sensor device 100-1 into the ground surface 120. The spike 118 has a generally sharp tip 119 that allows for easier insertion of the sensor device 100-1 into the ground surface 120 to form a connection between the earth and the sensor device 100-1. A user or machine can push the spike 118 into the ground surface 120 to cause at least a portion of the sensor device 100-1 to be buried in the earth beneath the ground surface 120. For example, the sensor device 100-1 can be driven into the ground surface using a hammer, either by a user or in an automated manner by a machine. In different examples, the sensor device 100-1 can be screwed into the ground by a wrench or planted in a prepared borehole with reduced disturbance of the surrounding earth. As another example, a borehole may be dug and the sensor device 100-1 may be placed therein. The borehole may be refilled after positioning the sensor device 100.

As further shown in FIG. 1A, openings 122 are provided in the housing 110 of the enlarged portion 104. A wire can be threaded through the openings 122 for the purpose of lifting the sensor device 100-1, for extracting the sensor device 100-1 from the ground surface 120.

In some examples, the sensor components 108A and 108B are sensor chips. A sensor chip refers to an integrated circuit device that includes a substrate (e.g. semiconductor substrate) on which particle motion sensors can be provided. For example, the particle motion sensors that can be provided in the sensor chip 108A or 108B can include MEMS particle motion sensors, such as MEMS accelerometers. A MEMS particle motion sensor can include a micro element (e.g. a micro cantilever) that is moveable in response to particle motion, where the movement of the micro element can be detected by a sensing element. In other examples, the sensor components 108A and 108B can include other types of particle motion sensors. It should be noted that the MEMS particle motion sensors do not have to be on the "chip," but that is an option. An example of a MEMS and electronics configuration is described in U.S. Patent Application Publication No. 2013/0315036.

In some implementations, the particle motion sensors that are provided in the sensor component 108A or 108B can measure translational data in multiple directions, such as the x, y and z directions. Examples of such arrangements are shown in FIGS. 2A and 2B, where the sensor component 108A or 108B includes a respective z sensor 202A or 202B (for measuring translational data along the z axis), a respective x sensor 204A or 204B (for measuring translational data along the x axis), and a respective y sensor 206A or 206B (for measuring translational data along they axis).

Figure 2B:
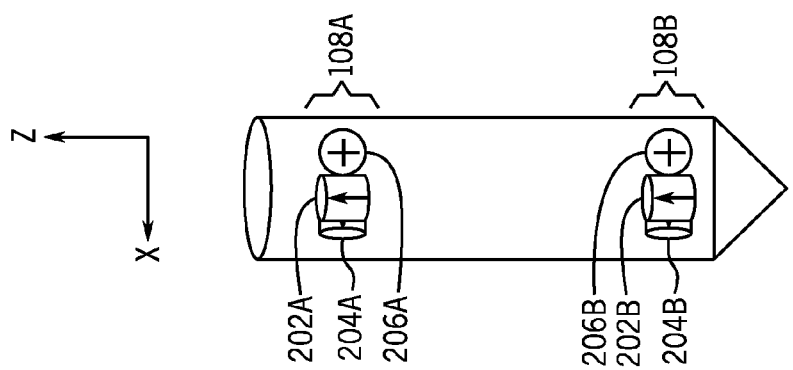
Figure 2A:
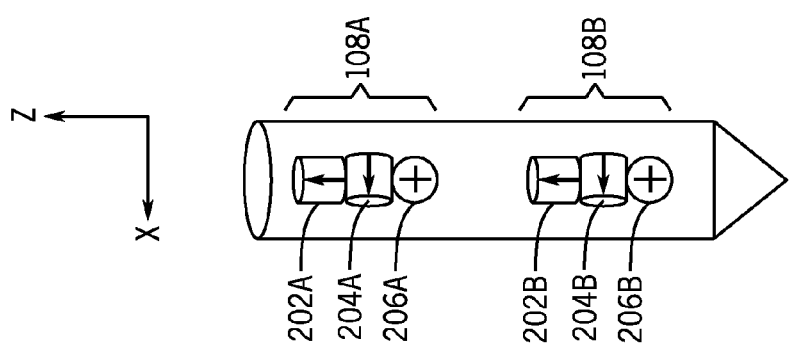

In further examples, such as shown in FIG. 2C, the sensor component 108A or 108B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 108A and 108B. In other examples, the z sensor 210 can be positioned elsewhere, such as in either 108A or 108B. In some implementations, a pair of sensors (e.g. 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 108A can include particle motion sensors to measure in just the x and y axes, while the sensor component 108B can include particle motion sensors to measure the x, y and z axes, and vice versa Note that the particle motion sensors in a given component (e.g. 108A) within the same sensor device 100 do not have to be orientated in the same direction as the other sensor component (e.g. 108B). If the relative angle between the sensor components 108A and 108B is known, then the measured data by the pair of particle motion sensors can be corrected using vector rotation.

Figure 3:
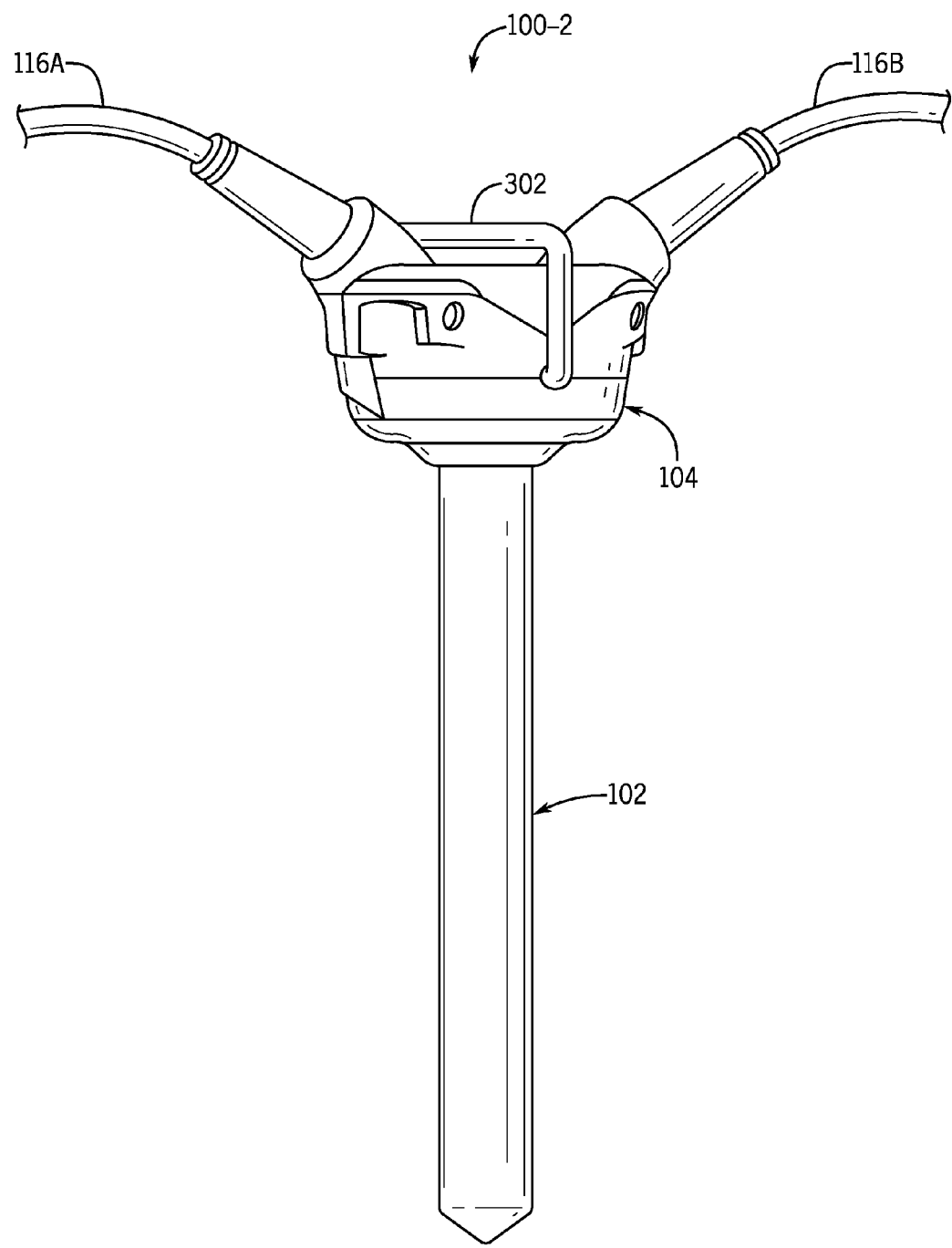

FIG. 3 is a side view of a sensor device 100-2 that is a variant of the sensor device 100-1 of FIGS. 1A-1B. The sensor device 100-2 includes the stick-shaped portion 102 and enlarged portion 104 arranged similarly as corresponding portions in the sensor device 100-1. However, in the sensor device 100-2, a handle 302 is provided. During deployment of the sensor device 100-2 into a ground surface, a force can be applied onto the handle 302, rather than to the top part of the enlarged portion 104. The handle 302 can be manipulated by a human hand, human foot, or a deployment tool. The handle 302 can be mechanically connected to the elongated housing 106 (FIG. 1B) of the stick-shaped portion 102, such that force applied on the handle 302 is transferred to the elongated housing 106 of the stick-shaped portion 102. This avoids the application of force directly onto the enlarged portion 104, which can contain sensitive electronic circuitry (e.g. the communication interface circuit 114 shown in FIG. 1B and other circuitry), which may cause damage to such circuitry.

The handle 302 can also be gripped by a human or tool to pull the sensor device 100-2 from the ground surface.

FIGS. 4A-4B are views of a sensor device 100-3 according to further implementations. In FIG. 4A, a stick-shaped portion 402 and an enlarged portion 404 are not mechanically attached to each other, but rather, are separated and connected by a communication medium 406, which can be an electrical cable, a fiber optic cable, and so forth. In the sensor device 100-3, the stick-shaped portion 402 is not mechanically fixed to the enlarged portion 404. The enlarged portion 404 is arranged similarly to the enlarged portion 104 of FIGS. 1A-1B. The stick-shaped portion 402 also includes an elongated housing, similar to the elongated housing 106 of FIG. 1B. The stick-shaped portion 402 also includes an inner chamber that contains sensor components, similar to those discussed above.

The stick-shaped portion 402 has a main elongated portion 404 and a connector portion 406 for connecting to the communication medium 406. In the example shown in FIGS. 4A-4B, the main elongated portion 404 and the connector portion 406 together form a general L-shape. In other examples, the stick-shape portion 402 can have other shapes.

A benefit of using the arrangement shown in FIGS. 4A-4B may be that planting of the stick-shaped portion 402 is made easier. Also, the stick-shaped portion 402 can be used with various different enlarged portions 404, which can have different configurations or may contain different types of circuitry, for example.

FIGS. 5A-5B illustrate a sensor device 100-4 according to further implementations. FIG. 5A is a side view of the sensor device 100-4, and FIG. 5B is a sectional view of the sensor device 100-4. The sensor device 100-4 includes a stick-shaped portion 502 and an enlarged portion 504 (similar to the stick-shaped portion 102 and enlarged portion 104 discussed above). The stick-shaped portion 502 includes an elongated housing 506, similar to the elongated housing 106 of FIG. 1B. An inner chamber of the elongated housing 506 includes sensor components 108A and 108B.

The enlarged portion 504 includes an outer housing 508 in which are provided various circuitry, including a communication interface circuit 510 that is connected to the communication media 512A and 512B.

In FIGS. 5A-5B, the communication media 512A and 512B are connected to the sides of the enlarged portion 504 such that the communication media 512A and 512B do not protrude or extend above a top surface 514 of the enlarged portion 504. In contrast, in each of the sensor devices 100-1, 100-2, and 100-3 discussed above, the communication media 116A and 116B are attached to the enlarged portion 104 or 404 at least partially through a top part of the enlarged portion 104 or 404, such that the communication media 116A and 116B protrude or extend above the top part of the enlarged portion 104 or 404.

Figure 6:
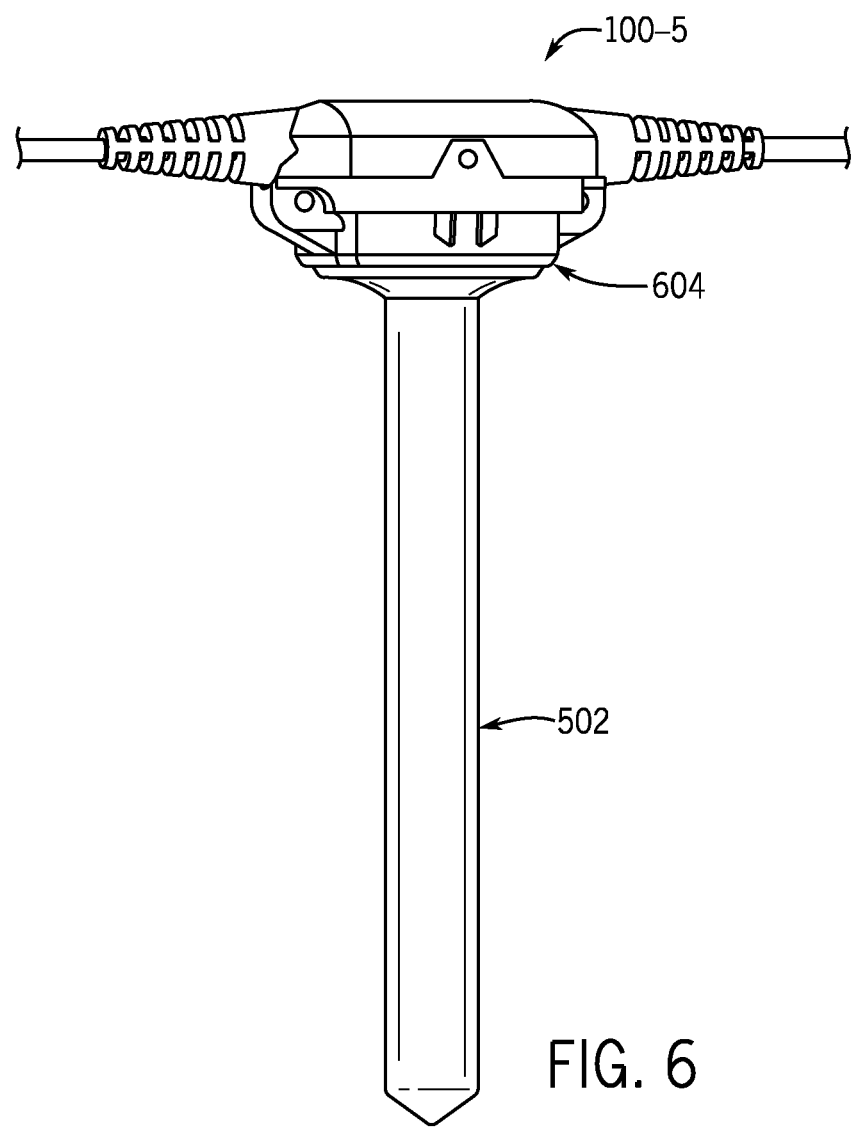

FIG. 6 depicts a sensor device 100-5 that is a variant of the sensor device 100-4 of FIGS. 5A-5B. The stick-shaped portion 502 of the sensor device 100-5 can be the same as the stick-shaped portion 502 of the sensor device 100-4, but an enlarged portion 604 of the sensor device 100-5 can have a different shape than the enlarged portion 504 of the sensor device 100-4. The enlarged portion 604 does not have the extended cover 516 that is part of the enlarged portion 504 shown in FIGS. 5A and 5B.

Figure 7:
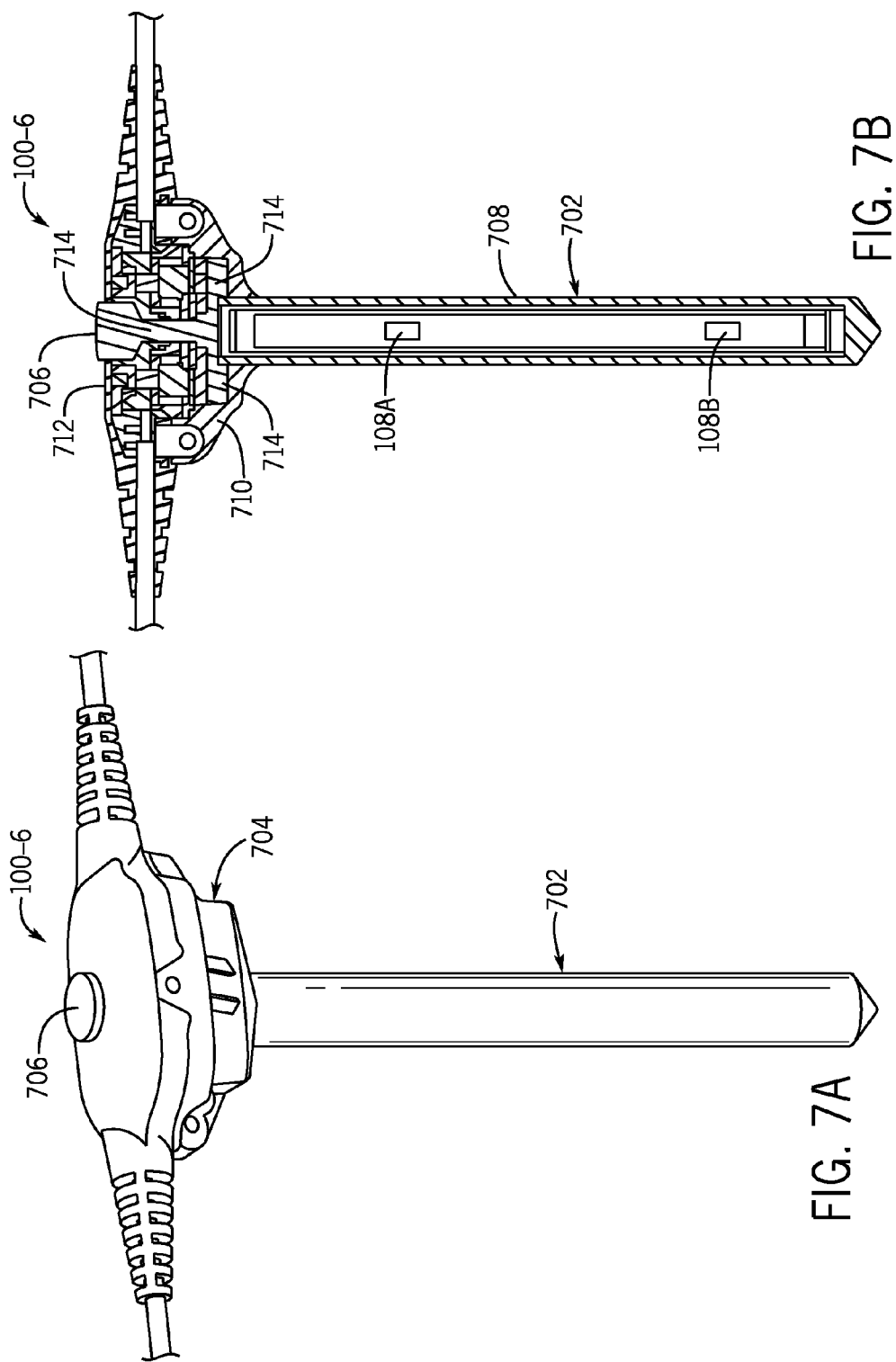

FIGS. 7A-7B illustrate a sensor device 100-6 according to further implementations. FIG. 7A is a side view of the sensor device 100-6, and FIG. 7B is a sectional view of the sensor device 100-6. The arrangement of the sensor device 100-6 can be similar to that of the sensor device 100-5 shown in FIG. 6, with some differences. The sensor device 100-6 includes a stick-shaped portion 702 and an enlarged portion 704, where the enlarged portion 704 includes an impact button 706 to which a force can be applied for pushing the sensor device 100-6 into a ground surface. As shown in FIG. 7B, the stick-shaped portion 702 includes an elongated housing 708. The enlarged portion 704 includes an outer housing 710 in which various circuitry (similar to those discussed above) is contained. As further shown in FIG. 7B, a portion of the impact button 706 extends above the top part 712 of the enlarged portion 710. This protruding portion of the impact button 706 allows for force to be applied to the impact button 706 without also impacting the top part 712 of the enlarged portion 710.

The impact button 706 is attached to a generally T-shaped connector structure 714, which mechanically connects the impact button 706 to the elongated housing 708 of the stick-shaped portion 702. Force applied on the impact button 706 is transferred by the connector structure 714 to the elongated housing 708 of the stick-shaped portion 702, to reduce force imparted on the circuitry contained in the enlarged portion 704.

Figure 8:
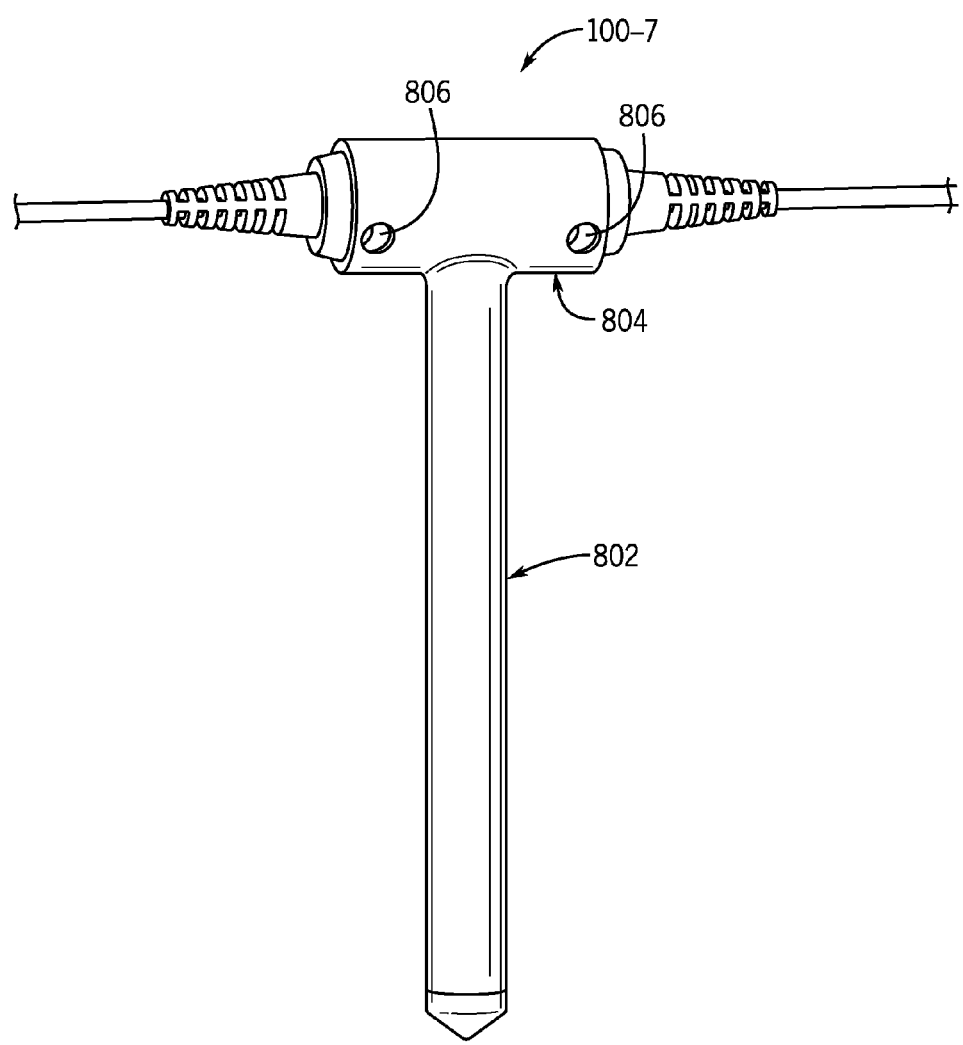

FIG. 8 depicts a sensor device 100-7 according to other implementations. The sensor device 100-7 includes a stick-shaped portion 802 and an enlarged portion 804. The stick-shaped portion 802 contains sensor components, while the enlarged portion 804 contains various circuitry as discussed above. In the sensor device 100-7, both the stick-shaped portion 802 and enlarged portion 804 are generally cylindrical in shape. The cylindrical structures 802 and 804 are arranged to be generally perpendicular such that a generally T-shaped sensor device 100-7 is provided.

As further shown in FIG. 8, openings 806 are provided in the enlarged portion 804 to allow for a wire to be threaded through the openings 806 for the purpose of pulling the sensor device 100-7 from the ground surface.

Figure 9:
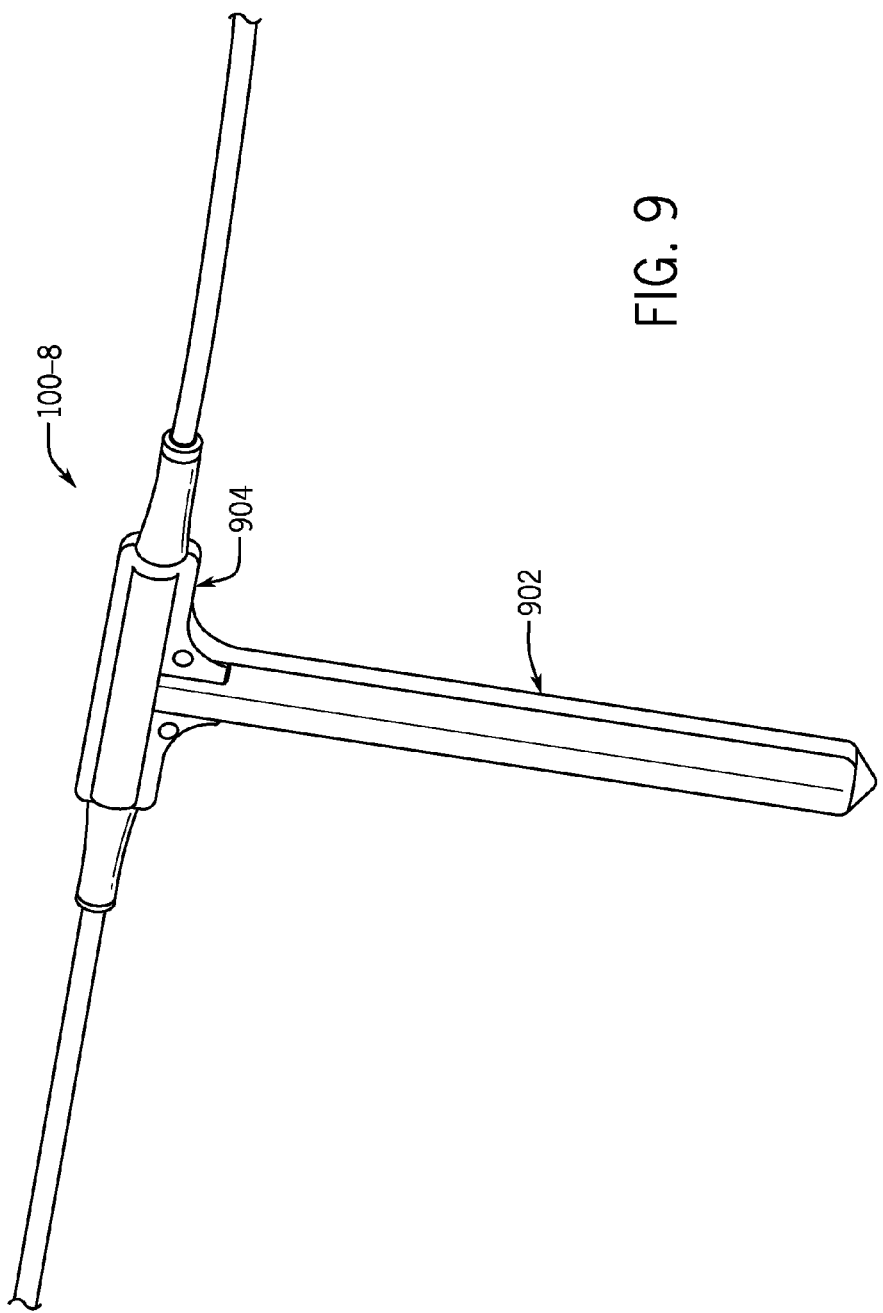

FIG. 9 shows a sensor device 100-8 that is a variant of the sensor device 100-7 shown in FIG. 8. Like the sensor device 100-7 of FIG. 8, the sensor device 100-8 in FIG. 9 also has a general T-shape, formed by a stick-shaped portion 902 and an enlarged portion 904.

Figure 10B:
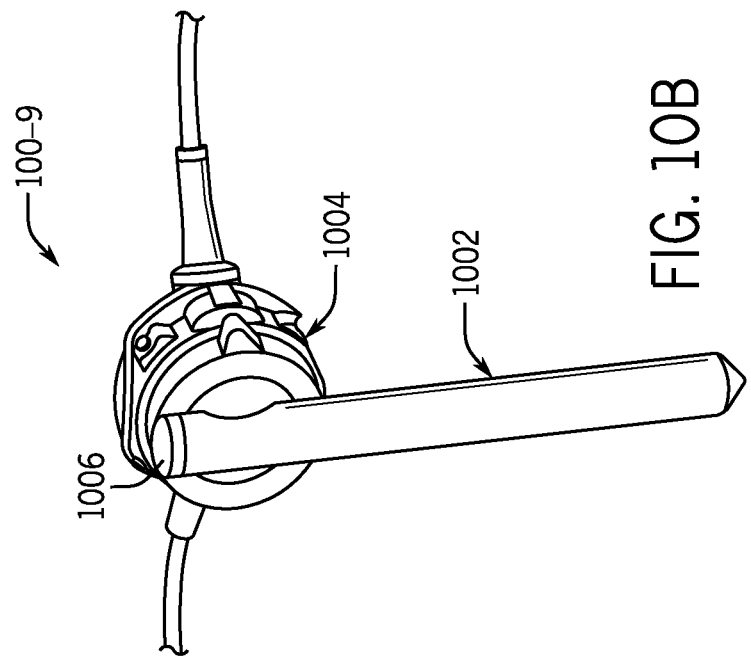
Figure 10A:
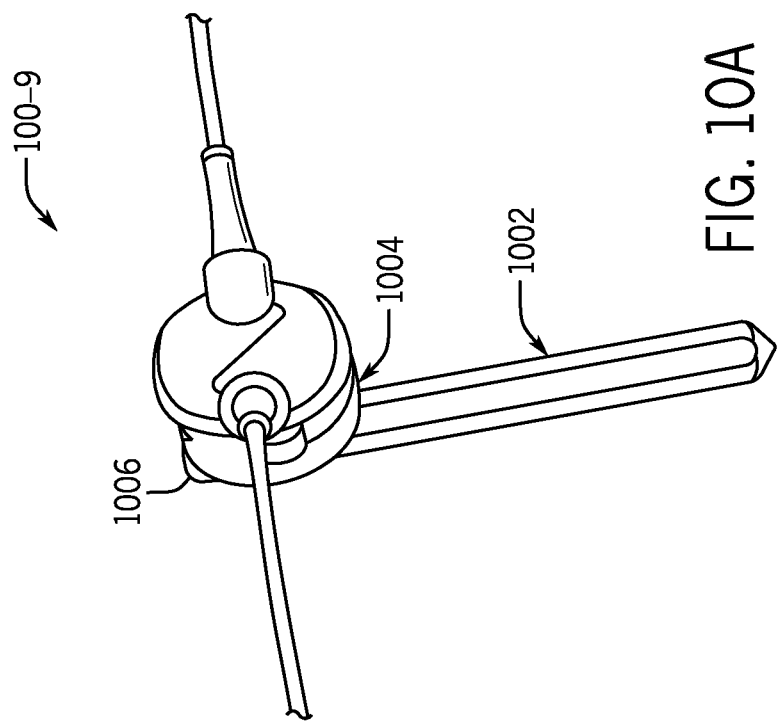

FIGS. 10A-10B illustrate a sensor device 100-9 according to yet further implementations. FIG. 10A is a perspective front view of the sensor device 100-9, while FIG. 10B is a perspective rear view of the sensor device 100-9. The sensor device 100-9 includes a stick-shaped portion 1002 and an enlarged portion 1004. Unlike various implementations of sensor devices discussed above, the enlarged portion 1004 is attached to a side of the stick-shaped portion 1002, rather than onto a top end of the stick-shaped portion 1002. In the arrangement of FIGS. 10A-10B, a top end 1006 of the stick-shaped portion 1002 is not covered by the enlarged portion 1004, and thus is accessible.

FIG. 11A shows a sensor device 100-10 according to further implementations. The sensor device 100-10 includes a stick-shaped portion 1102 and an enlarged portion 1004. Communication media 1106A and 1106B come vertically down towards the top part of the enlarged portion 1104 for connection to the enlarged portion 1104.

The enlarged portion 1104 includes an impact shoulder 1108 (which is generally ring-shaped) onto which a deployment tool can engage to cause deployment of the sensor device 100-10 into a ground surface.

As shown in FIGS. 11B and 11C, a deployment tool 1110 that has a semi-ring-shaped impact member 1112 can be engaged to the impact shoulder 1108 of the enlarged portion 1104. Once the semi-ring-shaped impact member 1112 is engaged with the impact shoulder 1108, downward force applied on the deployment tool 1110 can push the sensor device 100-10 downwardly into a ground surface.

Figure 12:
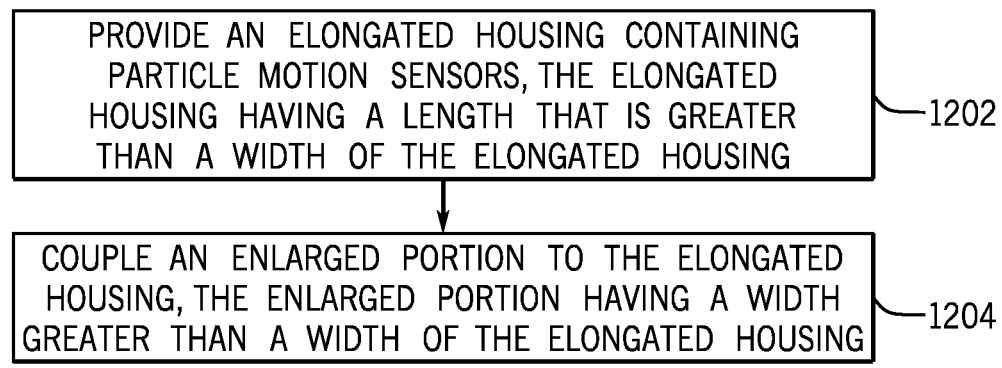
FIG. 12 is a flow diagram of a process according to some implementations.

FIG. 12 is a flow diagram of a process of forming a sensor device (which can be any of the foregoing sensor devices). The process includes providing (at 1202) an elongated housing containing particle motion sensors spaced apart along a longitudinal axis of the elongated housing, where the elongated housing has a length that is greater than a width of the elongated housing. The process further includes coupling (at 1204) a second portion to the elongated housing, the second portion including communication circuitry to communicate over a communication medium, the second portion having a width that is greater than the width of the elongated housing.

Details regarding computation of various types of measurement data (including rotation data and divergence data) are discussed further below.

The rotation data in the three spatial axes (k=x, y, z) is given by:

$$R_k = \frac{1}{2}\left[\frac{\partial v_i}{\partial j} - \frac{\partial v_j}{\partial i}\right], \qquad \text{(Eq. 1)}$$

where $v_i$ represents the particle velocity along the i (i=x, y, z) axis, and $v_j$ represents particle velocity along the j (j=x, y, z) axis. In the foregoing nomenclature, the i axis is orthogonal with respect to the j axis, and both the i and j axes are orthogonal with respect to the k axis. The gradient $$\frac{\partial v_i}{\partial j}$$

represents a spatial derivative of $v_i$ with respect to the j axis, and the gradient $$\frac{\partial v_j}{\partial i}$$

represents a spatial derivative of $v_j$ with respect to the i axis. The particle velocity measurements can be made at or just under the ground surface 120 (FIG. 1A). At or just under the ground surface 120, the following relationships for deriving rotation data along the x and y axis may apply:

$$R_y = -\frac{\partial v_z}{\partial x} = +\frac{\partial v_x}{\partial z}, \qquad \text{(Eq. 2)}$$

$$R_x = -\frac{\partial v_z}{\partial y} = -\frac{\partial v_y}{\partial z},\qquad\text{(Eq. 3)}$$

where $v_x$ represents particle velocity along the x direction, $v_y$ represents particle velocity along the y direction, and $v_z$ represents particle velocity along the z direction. This implies that the rotation components around a horizontal axis, $R_y$ or $R_x$, can be derived by measuring just one of the terms in the right hand side of Eq. 2 or 3.

Although reference is made to deriving rotation data based on measured velocities in the foregoing examples, it is noted that other types of translational data, including displacement or acceleration data, can be used for obtaining rotation data in a manner similar to that described in connection with Eqs. 2 and 3 above.

A characteristic of providing the sensor device at the ground surface 120 (or free surface between the air and a solid or between the water and a solid) is that a spatial gradient and rotation become equivalent to one another, as expressed by Eq. 2 or 3.

By taking advantage of such characteristic when the sensor device is provided at the ground surface 120, measurements of the vertical gradient of horizontal translational data in a spike-shaped sensor device can be used to obtain the rotation data. A vertical gradient refers to a gradient taken with respect to the z axis. Horizontal translation data refers to translational data along the x or y axis. The vertical gradient of horizontal translational data can be expressed as $$\frac{\partial v_x}{\partial z}\text{ or }\frac{\partial v_y}{\partial z},$$

for example.

In the example arrangement of FIG. 2A or 2B, the foregoing vertical gradients of horizontal translational data can be obtained using measurements of closely spaced apart x sensors 204A and 204B, or closely spaced apart y sensors 206A and 206B.

In addition to obtaining rotation data using measurements of translational data by particle motion sensors, divergence data can also be derived using the translational data, in accordance with further implementations.

The divergence of a wavefield, $\nabla\cdot V$, can be represented as:

$$\nabla\cdot V = \sum_{i=1}^{3}\frac{\partial v_i}{\partial i}.\qquad\text{(Eq. 4)}$$

In Eq. 4, i=(x, y, z) represent the three orthogonal axes. At the free surface, Eq. 4 is expressed as:

$$\nabla\cdot V = \frac{2\mu}{\lambda+2\mu}\left(\frac{\partial v_x}{\partial x}+\frac{\partial v_y}{\partial y}\right) = -\frac{2\mu}{\lambda}\left(\frac{\partial v_z}{\partial z}\right),\qquad\text{(Eq. 5)}$$

Eq. 5 indicates that, at the free surface, the divergence of a wavefield, can be measured by just one partial derivative term $$\left(\frac{\partial v_z}{\partial z}\right).$$

In Eq. 5, the parameters $\mu$ and $\lambda$ are Lame parameters. The ratio of the Lame parameters $\mu$ and $\lambda$ is a function of the near-surface P- and S-wave velocities $\alpha$ and $\beta$:

$$\frac{\mu}{\lambda} = \frac{\beta^2}{\alpha^2+\beta^2}.\qquad\text{(Eq. 6)}$$

The partial derivative in the right-hand side of Eqs. 2, 3, and 5 can be measured by differentiating measurements from closely spaced apart particle motion sensors, such as closely spaced apart particle motion sensors. In some examples, the particle motion sensors are spaced apart along the longitudinal axis of a sensor device by a distance D (FIG. 1B) that is less than or equal to about 0.3 times a wavelength of a target signal for measurement by the sensor device. In further examples, the particle motion sensors are spaced apart along the longitudinal axis by a distance D that is less than or equal to about 0.1 times a wavelength of a target signal for measurement by the sensor device. Note that the foregoing distances D between the particle motion sensors are applicable to computing the rotation data according to Eqs. 2 and 3 and/or the divergence data according to Eq. 5.

To achieve greater accuracy in computing rotation data and/or divergence data as discussed above based on measured translational data, the particle motion sensors are selected or configured such that the impulse responses of the particle motions sensors within the same sensor device are similar to one other to within a specified threshold difference of one other. This may be achieved by selecting matching pairs of particle motion sensors, or by applying calibration coefficients to measurement data acquired by the particle motion sensors.

As shown in FIG. 2A or 2B, in some implementations, the sensor device can include two sets (108A, 108B) of three orthogonally oriented particle motion sensors. This configuration allows computation of the two orthogonal rotation components, $R_x$ and $R_y$, around respective horizontal axes x and y. The particle motion sensors of the set may be positioned with a very small vertical separation inside the sensor device (as discussed above). The separation between the sets of particle motion sensors may not have to be the same for different directions (e.g. x and y direction), so long as the different separations are known.

Using the sensor device of FIG. 2A or 2B, the following data can be obtained: translational data (including $v_x$, $v_y$, $v_z$), rotation data (including $R_x$, $R_y$), and divergence data ($\nabla\cdot V$). With the sensor device of FIG. 2C, the same types of data can be obtained, except the divergence data. The foregoing data can be transmitted over a communication medium to a station.

In some examples, to obtain more accurate estimates of the translational data, translational data measurements in a given direction obtained by a pair of particle motion sensors for the given direction can be aggregated (e.g. summed, averaged, etc.). For example, as shown in FIG. 2A or 2B, the translational data measurements by the z sensors 202A and 202B can be aggregated to obtain a better estimate of the wavefield in the z direction, where this estimate is centered at the same depth as the obtained rotation data and divergence. Similarly, the translational data measurements by the x sensors 204A and 204B can be aggregated (at a computer system) to obtain a better estimate of the wavefield in the x direction, and the translational data measurements by they sensors 206A and 206B can be aggregated (at the computer system) to obtain a better estimate of the wavefield in the y direction.

In some examples, the separation (D in FIG. 1B) between the sets of particle motion sensors in the sensor device is between one centimeter and one meter. More specifically, the separation, D, can be between 5 centimeters and 50 centimeters, although other ranges are possible, such as on the order of centimeters.

The amplitude of the difference signal (difference between the translational data acquired by a first particle motion sensor and the translational data acquired by a second particle motion sensor, computed for determining the partial derivative in Eq. 2, 3, or 5) may be relatively small compared to the raw particle motion sensor output, because of the relatively small distance between the two particle motion sensors. To allow for an accurate determination of the rotation data and/or divergence data according to some implementations, the particle motion sensors used in a pair should be well matched in terms of phase and amplitude frequency response. In some examples, MEMS particle motions sensors may be well suited for some implementations, since they have a zero (or close to zero) phase response, and their amplitude response is flat at different frequencies.

In addition, MEMS particle motion sensors may be able to measure gravity, which can be used to calibrate the sensitivities of the MEMS particle motion sensors. As a result, use of MEMS particle motion sensors may lead to more accurate computation of partial derivatives of translational data, such as those computed in Eq. 2, 3, or 5.

Use of MEMS particle motion sensors may also allow the sensor device to have a reduced size, as compared to a sensor device that uses another type of particle motion sensors, such as geophones. A smaller sensor device is easier to deploy.

Figure 13:
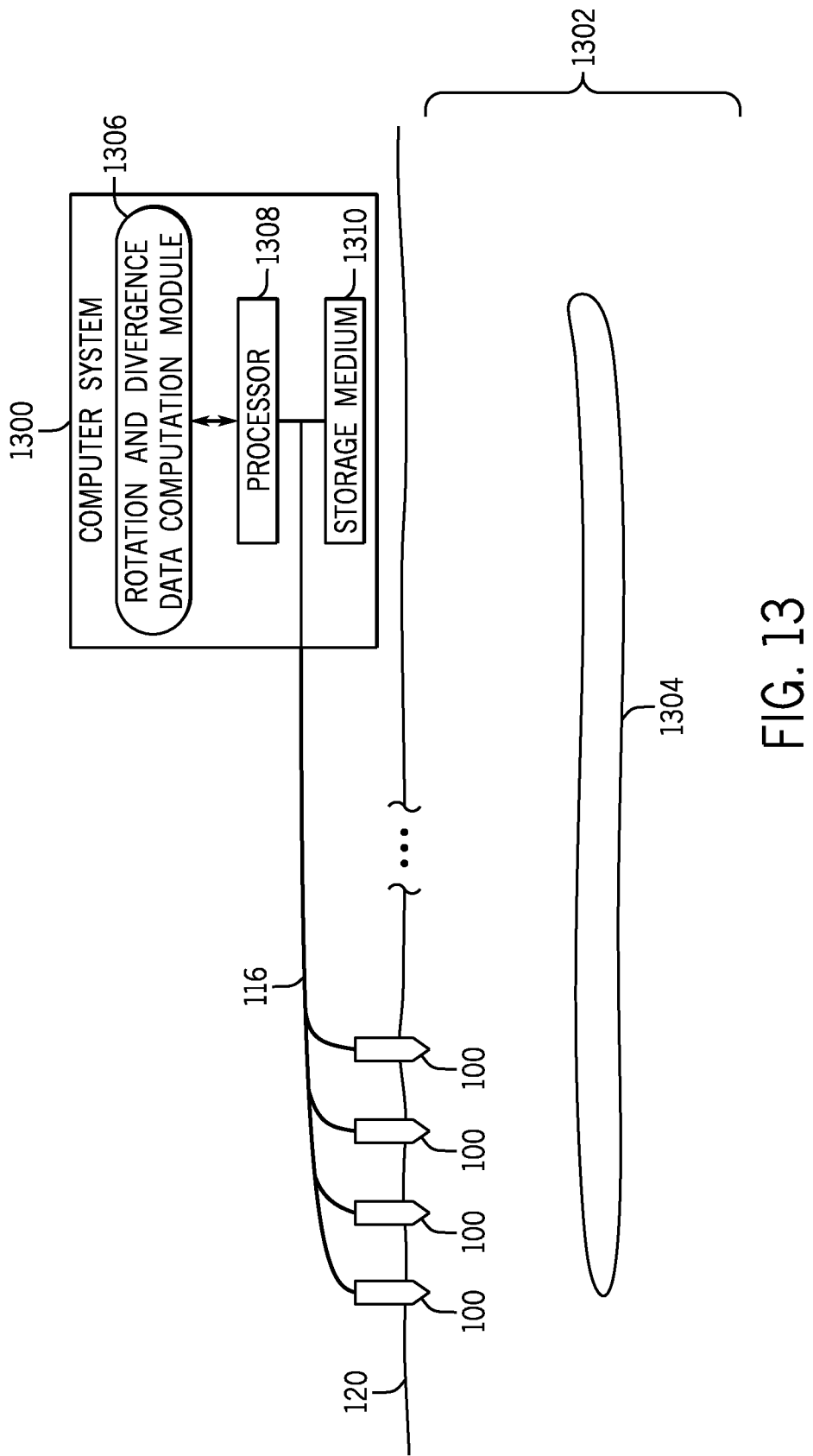
FIG. 13 is a schematic diagram of an example survey arrangement including sensor devices according to some implementations.

FIG. 13 is a schematic diagram of a land-based survey arrangement (including a seismic sensor system) that includes sensor devices 100 (any of sensor devices 100-1 to 100-10 discussed above) according to some implementations. In different examples, the sensor devices 100 can be deployed in a marine survey arrangement.

Measurements acquired by the sensor devices 100 are transmitted to a computer system 1300 over a communication medium 116 (e.g. 116A or 116B or both in FIG. 1A), where the measurements are recorded (stored in a storage medium or storage media 1310). In some examples, each sensor device 100 (or at least one of the sensor devices 100) can include the computer system 1300, or at least one or more processors 1308 and storage medium (or storage media) 1310. The measurements are made by the sensor devices 100 in response to seismic waves produced by one or more seismic sources (not shown). The seismic waves are propagated into a subterranean structure 1302, and reflected from a subterranean element 1304 of interest. The reflected waves are detected by the sensor devices 100.

The computer system 1300 includes a rotation and divergence data computation module 1306, which can be implemented with machine-readable instructions that are executable on one or more processors 1308. The rotation and divergence data computation module 1306 can compute rotation data and divergence data as discussed above.

The processor(s) 1308 can be coupled to the storage medium (or storage media) 1310, which can store data, such as translational data received from the sensor devices 100.

The storage medium (or storage media) 1310 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A sensor device comprising:
an elongated housing containing particle motion sensors spaced apart along a longitudinal axis of the elongated housing, wherein the elongated housing has a length that is greater than a width of the elongated housing, wherein the particle motion sensors in the elongated housing are spaced apart by a distance along the longitudinal axis, without providing particle motion sensors spaced apart in a direction perpendicular to the longitudinal axis; and
a second portion including communication circuitry to communicate over a communication medium, the second portion coupled to the elongated housing and having a width that is greater than the width of the elongated housing, wherein the second portion includes an impact button that includes a protruding portion that protrudes above a top surface of the second portion, the impact button to receive an impact force for deploying the sensor device into a ground surface, and wherein the second portion is mechanically connected to the elongated housing using a connector structure, and wherein the protruding portion allows for force to be applied to the impact button without also impacting a top part of the second portion.

2. The sensor device of claim 1, wherein the length of the elongated housing is greater than or equal to 15 centimeters.

3. The sensor device of claim 1, further comprising a handle attached to the second portion, the handle for manipulation by a human or by a tool to deploy the sensor device into a ground surface.

4. The sensor device of claim 1, wherein the second portion is mechanically attached to the elongated housing.

5. The sensor device of claim 1, wherein the second portion is not mechanically fixed to the elongated housing, the second portion being coupled by a communication medium to the elongated housing.

6. The sensor device of claim 1, wherein the second portion is to receive a communication medium at a side of the second portion such that the communication medium does not protrude above a top part of the second portion.

7. The sensor device of claim 1, further comprising openings in the second portion into which a wire is threadable to lift the sensor device from a ground surface.

8. The sensor device of claim 1, wherein the second portion has an impact shoulder onto which a deployment tool is engageable to deploy the sensor device into a ground surface.

9. The sensor device of claim 8, wherein the impact shoulder is generally ring-shaped.

10. The sensor device of claim 1, wherein the particle motion sensors are to measure translational data in a first direction, the particle motion sensors spaced apart along a second, different direction along the longitudinal axis; and
    wherein the communication circuitry is to send the translational data to a system to compute rotation data about a third direction based at least in part on computing a gradient of the translational data with respect to the second direction.

11. The sensor device of claim 10, wherein the first direction is orthogonal to the second direction, and the first and second directions are both orthogonal to the third direction.

12. A method of forming a sensor device, comprising:
    providing an elongated housing containing particle motion sensors spaced apart along a longitudinal axis of the elongated housing, wherein the elongated housing has a length that is greater than a width of the elongated housing, wherein the particle motion sensors in the elongated housing are spaced apart by a distance along the longitudinal axis, without providing particle motion sensors spaced apart in a direction perpendicular to the longitudinal axis;
    coupling a second portion to the elongated housing, the second portion including communication circuitry to communicate over a communication medium, the second portion having a width that is greater than the width of the elongated housing; and
    providing an impact button on the second portion, the impact button that includes a protruding portion that protrudes above a top surface of the second portion, the impact button to receive an impact force for deploying the sensor device into a ground surface, and wherein the second portion is mechanically connected to the elongated housing using a connector structure, and wherein the protruding portion allows for force to be applied to the impact button without also impacting a top part of the second portion.

13. The method of claim 12, wherein the length of the elongated housing is greater than 15 centimeters.

14. The method of claim 12, wherein the width of the second portion is greater than the width of the elongated housing by a factor of 2 or greater.

15. The method of claim 12, further comprising attaching a handle to the second portion, the handle for manipulation by a human or by a tool to deploy the sensor device into a ground surface.

16. The method of claim 12, wherein coupling the second portion to the elongated housing comprises mechanically attaching the second portion to the elongated housing.

17. The method of claim 12, wherein coupling the second portion to the elongated housing comprises coupling using a communication medium such that the second portion is not mechanically fixed to the elongated housing.

18. A system comprising:
    a plurality of sensor devices, wherein at least one of the sensor devices comprises:
        an elongated housing containing particle motion sensors spaced apart along a longitudinal axis of the elongated housing, wherein the elongated housing has a length that is greater than a width of the elongated housing, wherein the particle motion sensors in the elongated housing are spaced apart by a distance along the longitudinal axis, without providing particle motion sensors spaced apart in a direction perpendicular to the longitudinal axis; and
        a second portion including communication circuitry to communicate over a communication medium, the second portion coupled to the elongated housing and having a width that is greater than the width of the elongated housing, wherein the second portion includes an impact button that includes a protruding portion that protrudes above a top surface of the second portion, the impact button to receive an impact force for deploying the sensor device into a ground surface, and wherein the second portion is mechanically connected to the elongated housing using a connector structure, and wherein the protruding portion allows for force to be applied to the impact button without also impacting a top part of the second portion.

19. The system of claim 18, further comprising a computer coupled to the sensor devices.

* * * * *